(12) United States Patent
Lee et al.

(10) Patent No.: US 11,199,876 B2
(45) Date of Patent: Dec. 14, 2021

(54) FLEXIBLE DISPLAY DEVICE

(71) Applicant: LG ELECTRONICS INC., Seoul (KR)

(72) Inventors: Minjong Lee, Seoul (KR); Sunggyu Koh, Seoul (KR); Jongkyu Ju, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/984,905

(22) Filed: Aug. 4, 2020

(65) Prior Publication Data

US 2021/0216108 A1    Jul. 15, 2021

(30) Foreign Application Priority Data

Jan. 9, 2020 (WO) ............... PCT/KR2020/000373

(51) Int. Cl.
*G06F 1/16* (2006.01)
*H04B 1/3827* (2015.01)

(52) U.S. Cl.
CPC .......... *G06F 1/1652* (2013.01); *G06F 1/1615* (2013.01); *G06F 1/1675* (2013.01); *H04B 1/3827* (2013.01)

(58) Field of Classification Search
CPC ..... G06F 1/1615; G06F 1/1652; G06F 1/1643
See application file for complete search history.

(56) References Cited

U.S. PATENT DOCUMENTS

| | | | |
|---|---|---|---|
| 2013/0058063 A1* | 3/2013 | O'Brien | G06F 1/1652 361/807 |
| 2014/0211399 A1 | 7/2014 | O'Brien | |
| 2018/0077808 A1* | 3/2018 | Seo | G06F 3/04164 |
| 2018/0188778 A1* | 7/2018 | Shin | G06F 1/1652 |
| 2020/0209923 A1* | 7/2020 | Ahn | G09F 9/301 |
| 2020/0319672 A1* | 10/2020 | Kim | G06F 1/1656 |

FOREIGN PATENT DOCUMENTS

| | | |
|---|---|---|
| KR | 10-2014-0014967 A | 2/2014 |
| KR | 10-1861077 B1 | 6/2018 |
| KR | 10-2019-6004618 A | 1/2019 |
| KR | 10-20198100329 A | 8/2019 |

* cited by examiner

*Primary Examiner* — Nidhi Thaker
(74) *Attorney, Agent, or Firm* — Birch, Stewart, Kolasch & Birch, LLP

(57) ABSTRACT

A flexible display device that includes a first body, a second body located side by side with the first body and is able to move relative to the first body, a flexible display that can change an area exposed to the outside by relative movement between the first body and the second body, and a link part fixed to one side of the first body and the second body, respectively, and that is deformable between the first body and the second body, so as to guide the second body to move toward the first body.

18 Claims, 10 Drawing Sheets

(a)  (b)

FLEXIBLE DISPLAY DEVICE

CROSS-REFERENCE TO RELATED APPLICATIONS

This application claims the priority benefit of International Application No. PCT/KR2020/000373 filed on Jan. 9, 2020, the contents of which is incorporated by reference herein in its entirety.

FIELD

The present disclosure relates to a flexible display device having a deformable flexible display.

BACKGROUND

Terminals may be divided into mobile/portable terminals and stationary terminals according to mobility. Also, the mobile terminals may be classified into handheld types and vehicle mount types according to whether or not a user can directly carry.

Recently, functions of the mobile terminals have been diversified. Examples of such functions include data and voice communications, capturing images and video via a camera, recording audio, playing music files via a speaker system, and displaying images and video on a display. Some mobile terminals include additional functionality that supports electronic game playing, while other terminals are configured as multimedia players. In particular, recent mobile terminals can receive multicast signals that provide visual contents such as broadcast, video, or television programs.

Efforts are ongoing to support and increase the functionality of mobile terminals. Such efforts include hardware (structural) and/or software improvements.

To this end, mobile terminals are evolved into various types of designs, and efforts are being made to develop new types of mobile terminals to meet needs of users who want newer and more diverse types of designs. Here, the new types of mobile terminals mean a structural change or improvement in the mobile terminals for providing more convenience to the users.

For the structural change and improvement, a mobile terminal having a display designed to be curved or bent at least a portion thereof has received a growing attention. In particular, as a flexible display that can be curved has been developed, various researches have been conducted to apply such a flexible display to mobile terminals.

In a mobile terminal having a flexible display, at least a portion of the flexible display is exposed to the outside, and at least another portion thereof is accommodated in a body (or main body) and is not exposed to the outside. Such a flexible display device can achieve various sizes of a screen by using its deformable characteristics of the flexible display.

For example, an area of the flexible display exposed to the outside may be extended by being drawn out from the body, allowing a user to extend or reduce the screen as desired.

As such, at least a portion of the flexible display needs to be smoothly moved while being located inside the body, and at least another portion of the flexible display is extended and exposed to the outside, so that the area exposed to the outside can be used to output the screen, or utilized as a touch sensing area.

However, in such a flexible display device, many components are required to utilize the deformable characteristics of the flexible display. As a result, a structure is more likely to be complicated, making it difficult to utilize an internal space.

In addition, when the flexible display located inside the body is pulled out, an empty space is generated inside the body due to movement of the body. Accordingly, an extended portion of the flexible display cannot be properly supported. Further, when a load is applied to the extended portion of the flexible display, durability may be decreased due to unrestricted (or limitless) deformation.

Thus, a flexible display device having a structure that allows the screen to be exposed to front and rear surfaces of a body needs to be provided so that an exposed area of a flexible display can be increased or decreased. In addition, a flexible display device having a stable structure that allows smooth movement in response to a change in the state of a flexible display needs to be provided.

SUMMARY OF THE DISCLOSURE

Technical Problem

One aspect of the present disclosure is to provide a flexible display device having a flexible display that can be accommodated in or pulled out from a body, so that an area of the flexible display exposed to the outside is changed, thereby improving user convenience and portability.

Another aspect of the present disclosure is to provide a flexible display device capable of moving smoothly regardless of being pulled out from or inserted into a body, and securely supporting the extended flexible display even when an empty space is generated inside the body due to movement of the body.

Technical Solution

Embodiments disclosed herein provide a flexible display device that may include a first body, a second body located side by side with the first body and configured to move relative to the first body, a flexible display configured to change an area exposed to outside by relative movement between the first body and the second body, and a link part fixed to one side of the first body and the second body, respectively, and configured to be deformable between the first body and the second body, so as to guide the second body to move toward the first body.

According to one embodiment, the link part may include a plurality of link members connected to one another. The second body, by rotation between the link members, may be moveable relative to the first body while sliding with respect to the first body.

According to one embodiment, the link part may include a plurality of link members arranged in a hexagonal shape.

According to one embodiment, the plurality of link members is configured such that adjacent link members are rotatable with respect to each other, so as to correspond to the relative movement between the first body and the second body.

According to one embodiment, a constant rotation angle may be formed between the adjacent link members. In more detail, the link members may be deformed to be in close contact with each other when the first body and the second body are close to each other, and the link members may be deformed in a spread-out shape when the first body and the second body are far from each other.

According to one embodiment, the plurality of link members may include a first member extending in one direction and having one side thereof coupled to the first body, a second member connected to the first member and configured to be rotatable with the first member with respect to a connecting portion, and a third member connected to the second member and having one side thereof coupled to the second body.

According to one embodiment, the link part may be configured such that a plurality of link members is arranged side by side and rotates in response to the relative movement between the first body and the second body.

According to one embodiment, the first member may include a first extended portion extending in one direction, a fixing portion protruding from one surface of the extended portion, and a first connecting portion provided at both ends of the extended portion to form a hinge axis with a ring shape.

According to one embodiment, the second member may include a second extended portion extending in one direction, and a second connecting portion protruding from both ends of the second extended portion and having the first connecting portion inserted therein so as to form the hinge axis together with the first connecting portion.

According to one embodiment, the second member may further include a rotation restriction portion that protrudes from one side of the second extended portion. The rotation restriction portion may have a protruding jaw shape so as to limit an angle of rotation between the second members.

According to one embodiment, a height of the link part may be equal to a height the first body and the second body.

According to one embodiment, an elastic member having both ends thereof respectively fixed to one side of the first body and one side of the second body and formed through the link part, so as to provide an elastic force in response to deformation of the link part.

According to one embodiment, the area of the flexible display exposed to the outside may be decreased as the first body and the second body are in close contact with each other, when the link part is deformed to be narrowed.

According to one embodiment, the area of the flexible display exposed to the outside may be increased as the first body and the second body are away from each other, when the link part is deformed to be expanded.

According to one embodiment, the flexible display may be installed such that at least a portion thereof is rotatable inside the second body. The least portion of the flexible display may be rolled or unrolled inside the second body by the relative movement between the first body and the second body, so that the area exposed to the outside is changed.

According to one embodiment, a terminal mounting space to which a mobile terminal is mounted may be provided at a front surface of the first body to be recessed by a thickness of the mobile terminal.

According to one embodiment, a rear plate coupled to a rear surface of the flexible display and configured to be deformable together with the flexible display may be further included.

Advantageous Effects of the Present Invention

The embodiments of the present disclosure may provide at least one or more of the following benefits.

According to a flexible display device disclosed herein, a first body and a second body are away from each other or close to each other as at least a portion of a flexible display is inserted into or pulled out from an inside of a body. Thus, an area exposed to the outside can be changed, which gives a user both convenience and portability as the user easily activates the externally exposed area of the flexible display.

In addition, relative movement of the first body and the second body may be guided and supported by movement of link members constituting a link part, allowing smooth movement of the flexible display. As the link part is located in a space generated between the first body and the second body, the extended flexible display can be supported. This may prevent an impact or unnecessary load from being applied to the flexible display, thereby increasing durability.

Figure 2:
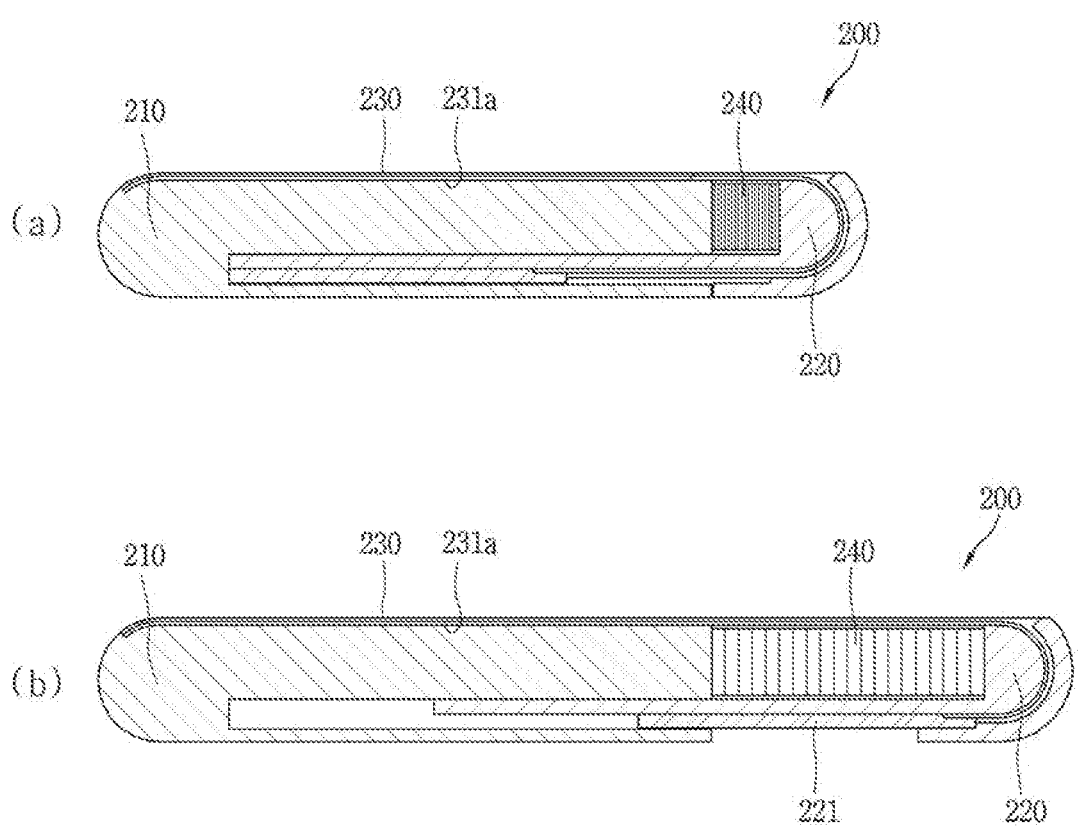

(a) of FIG. 2 is a sectional view of a flexible display device in a first state, and (b) of FIG. 2 is a sectional view of the flexible display device in a second state.

Figure 3:
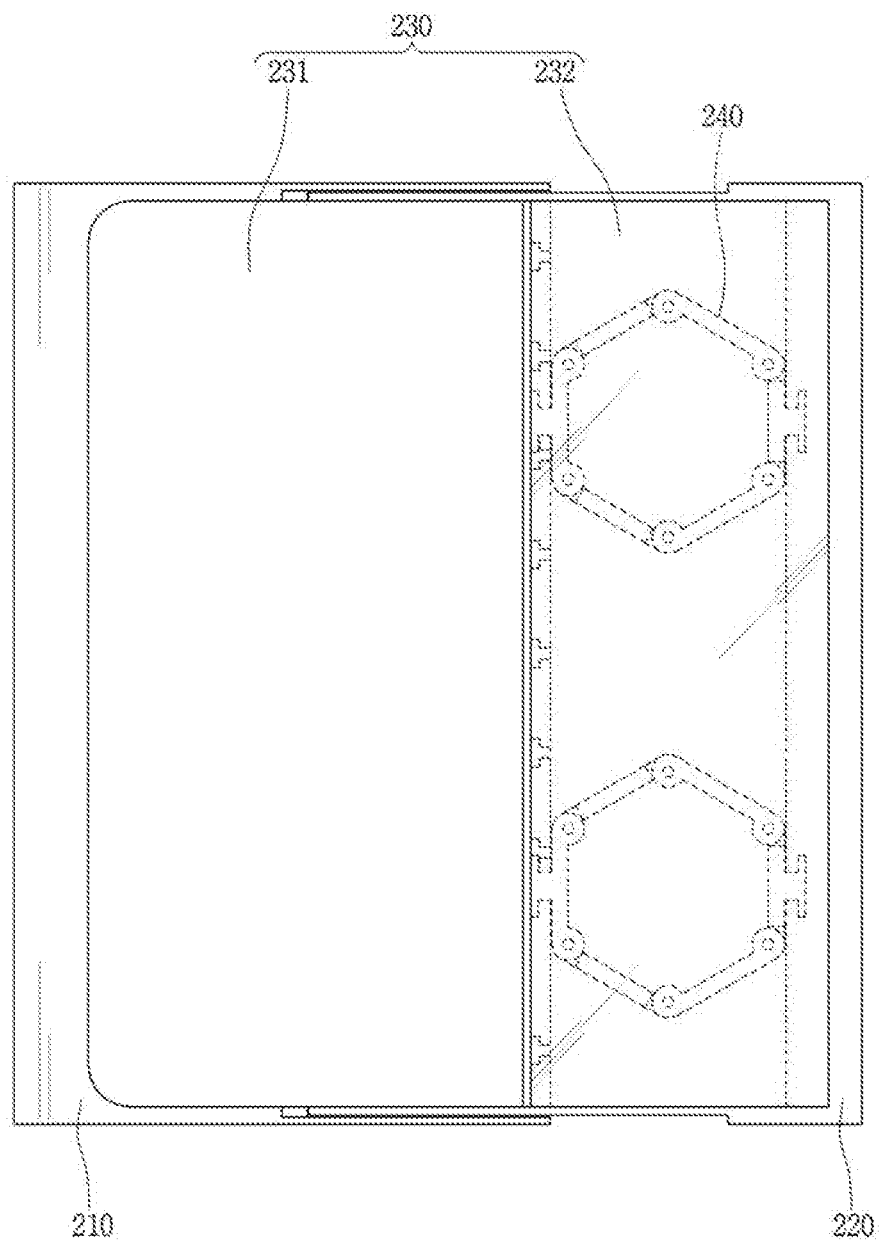

FIG. 3 is a conceptual view illustrating the flexible display device in (b) of FIG. 2.

Figure 4:
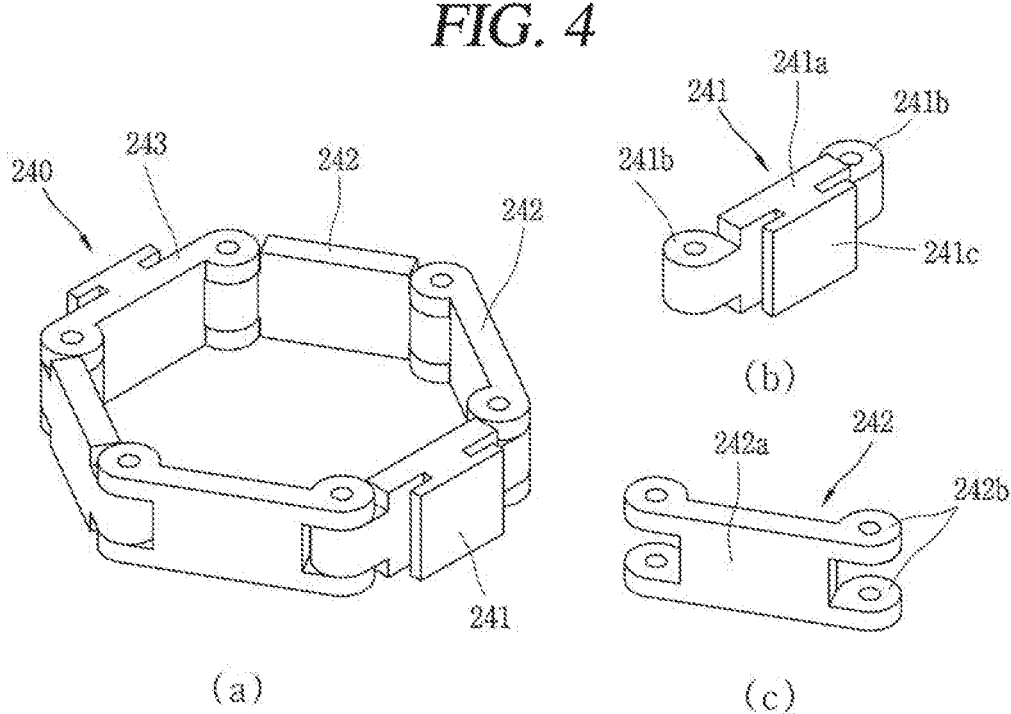

(a) of FIG. 4 is a perspective view of a link part, and (b) and (c) of FIG. 4 are views illustrating link members constituting the link part.

Figure 5:
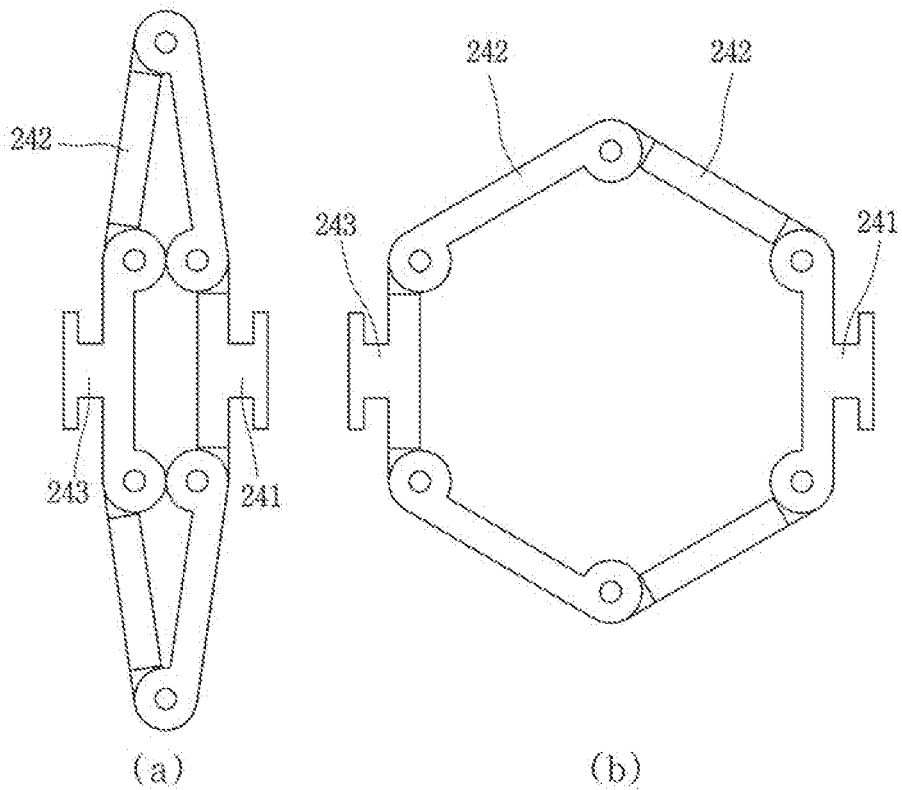

(a) of FIG. 5 is a conceptual view illustrating a link part when a flexible display device is in a first state, and (b) of FIG. 5 is a conceptual view illustrating the link part when the flexible display device is in a second state.

Figure 6:
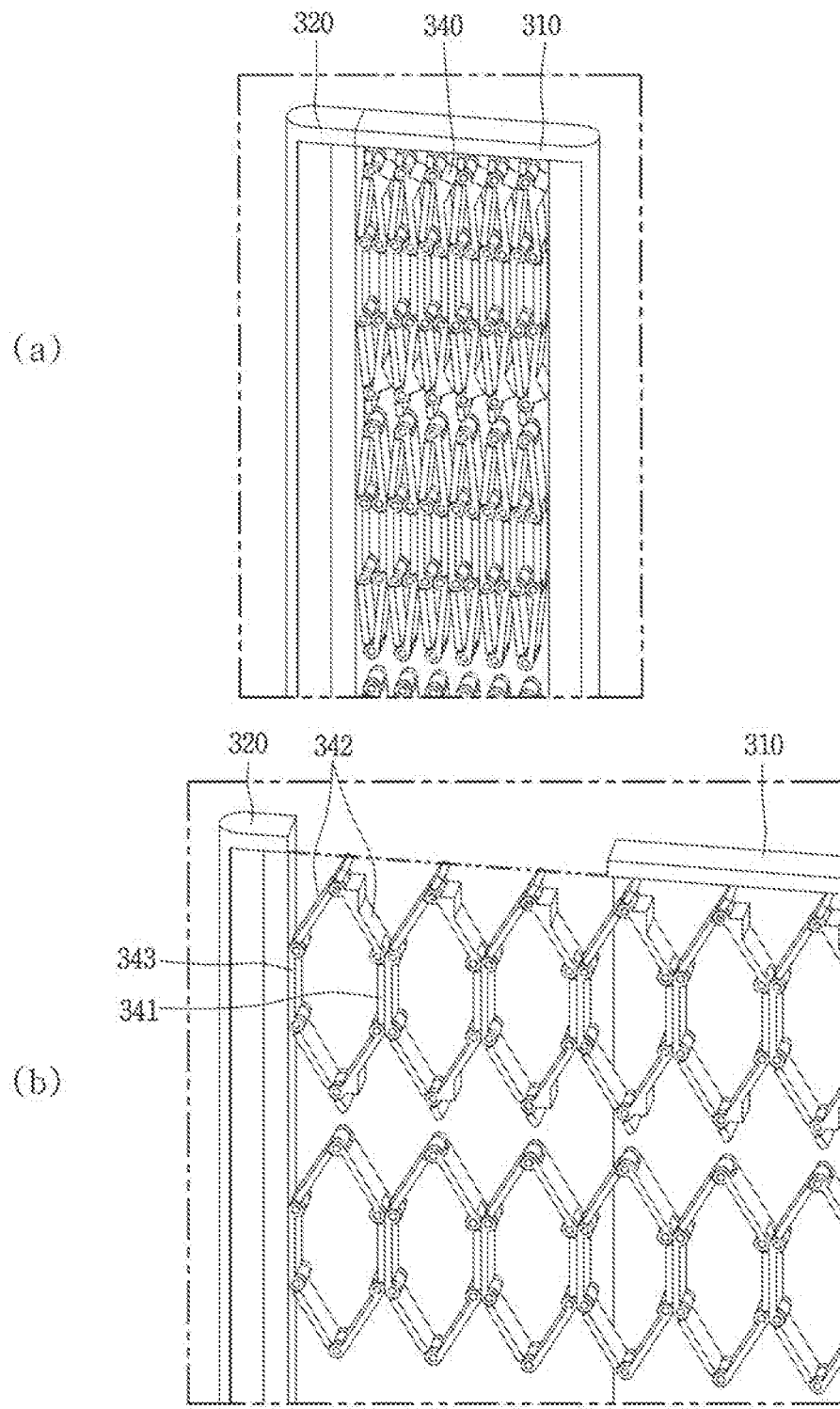

(a) and (b) of FIG. 6 are conceptual views illustrating a flexible display device in a first state and a second state, respectively, according to another embodiment of the present disclosure.

Figure 7:
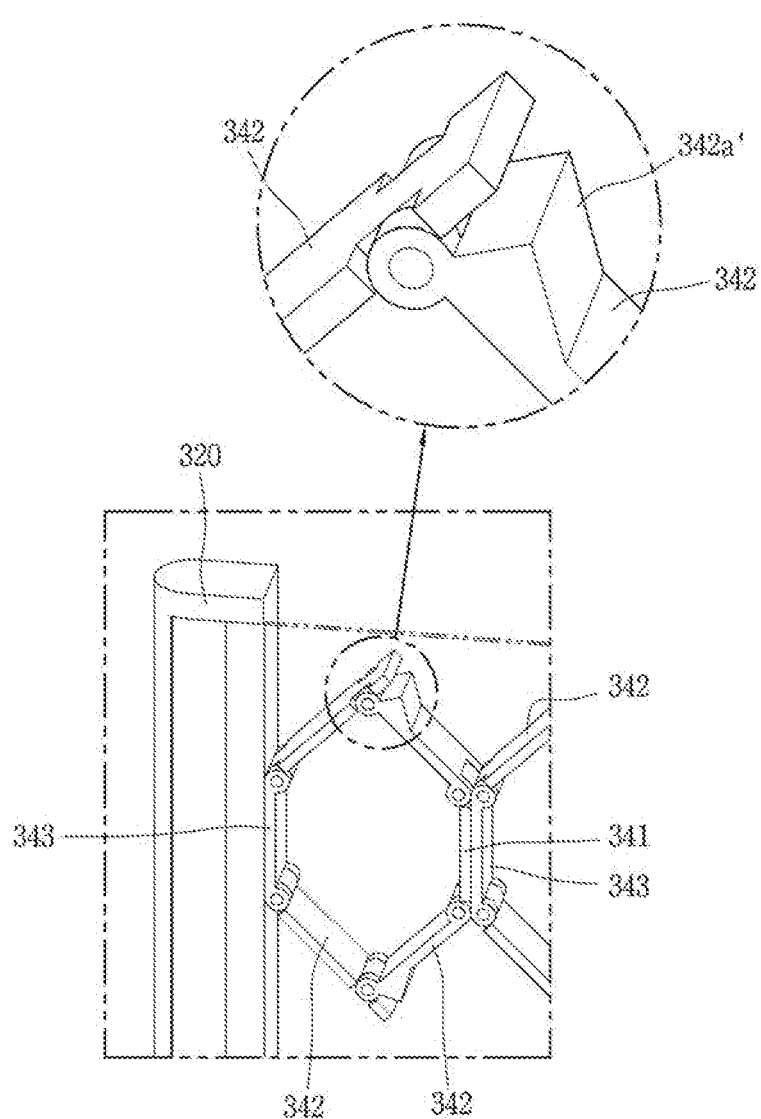

FIG. 7 is an enlarged conceptual view of a rotation restriction portion provided at a second member.

Figure 8:
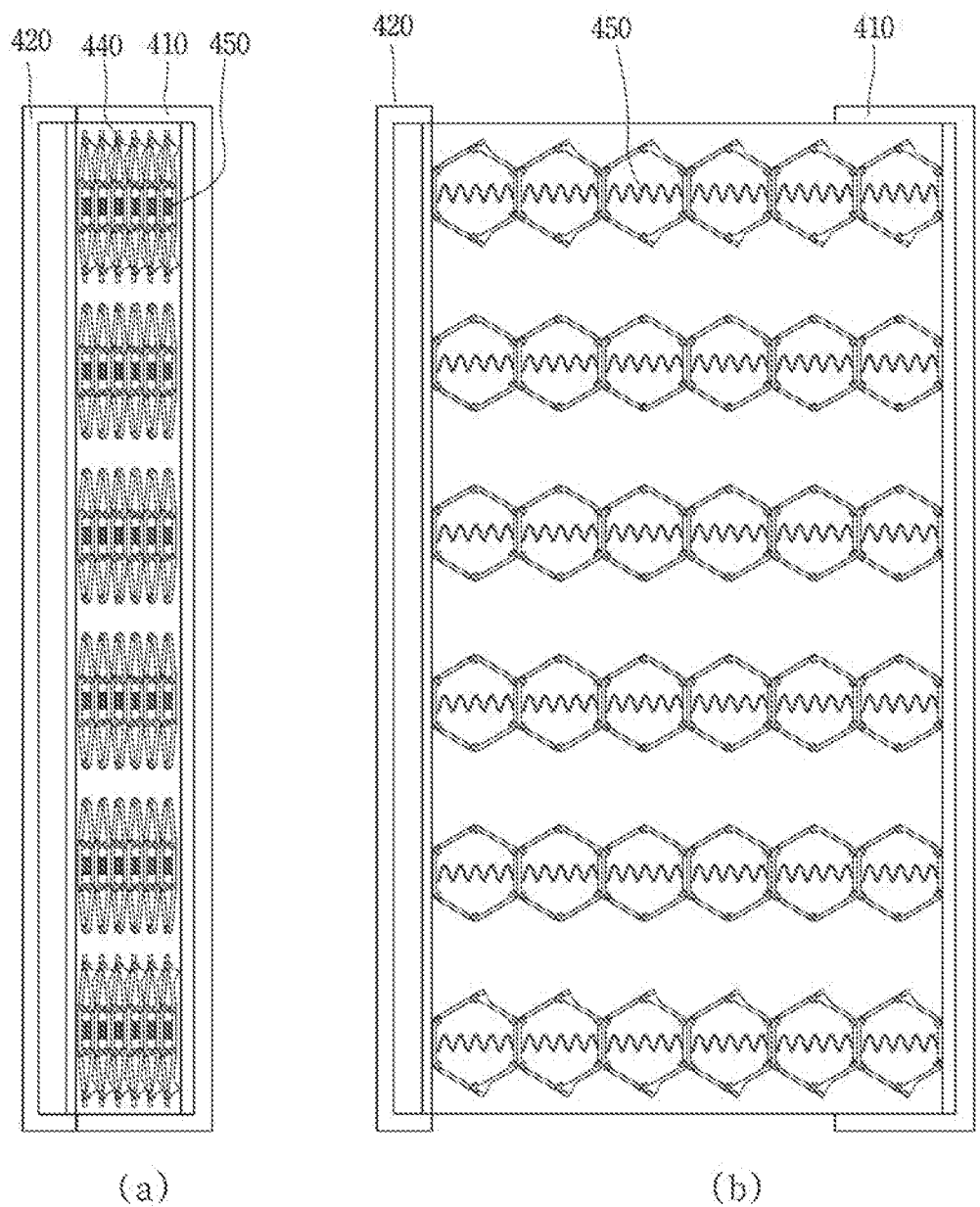

(a) and (b) of FIG. 8 are conceptual views of another embodiment of a link part provided with an elastic member for supporting a flexible display together with the link part.

Figure 9:
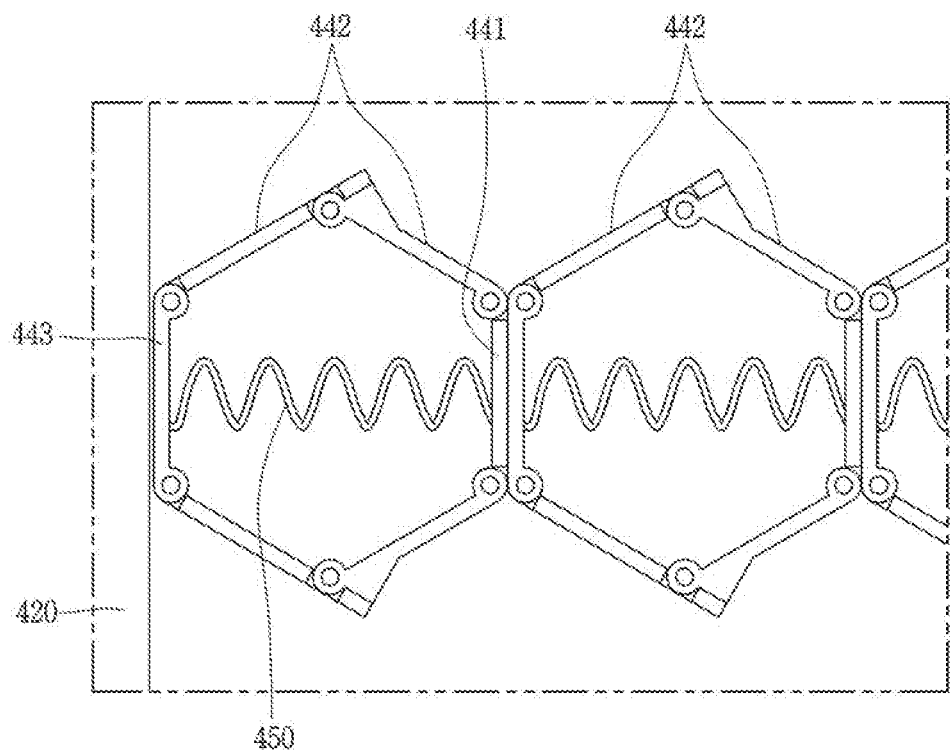

FIG. 9 is an enlarged conceptual view illustrating a link part provided with an elastic member.

Figure 10:
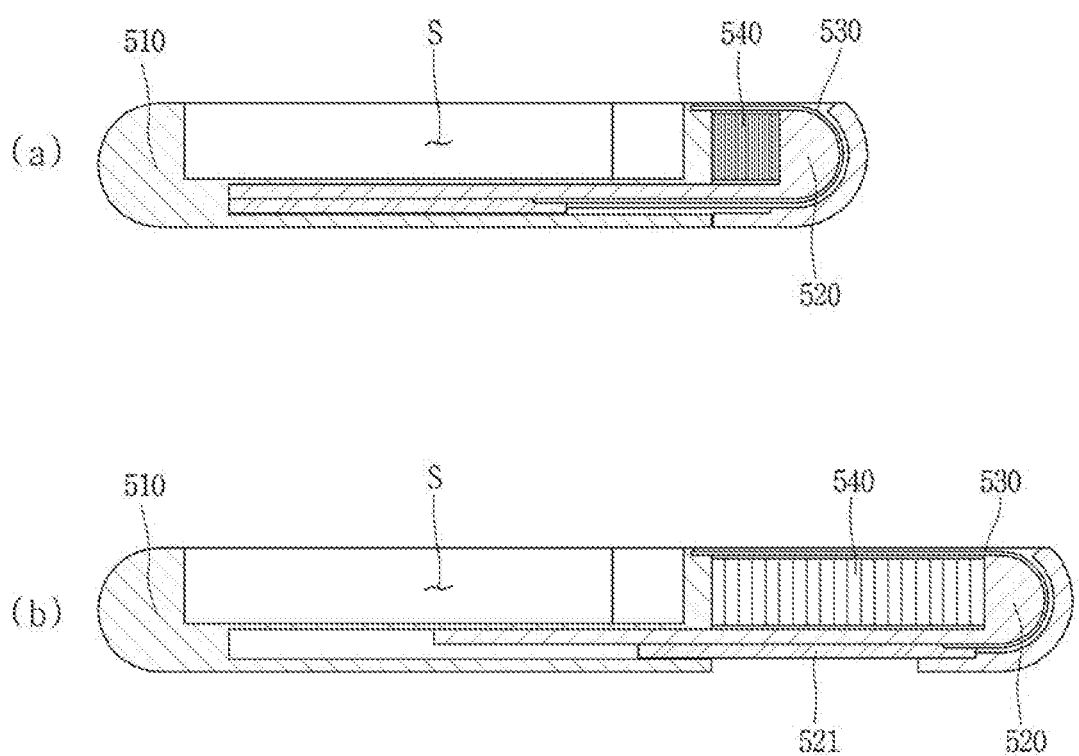

(a) and (b) of FIG. 10 are conceptual views of a flexible display device according to another embodiment of the present disclosure.

Figure 11:
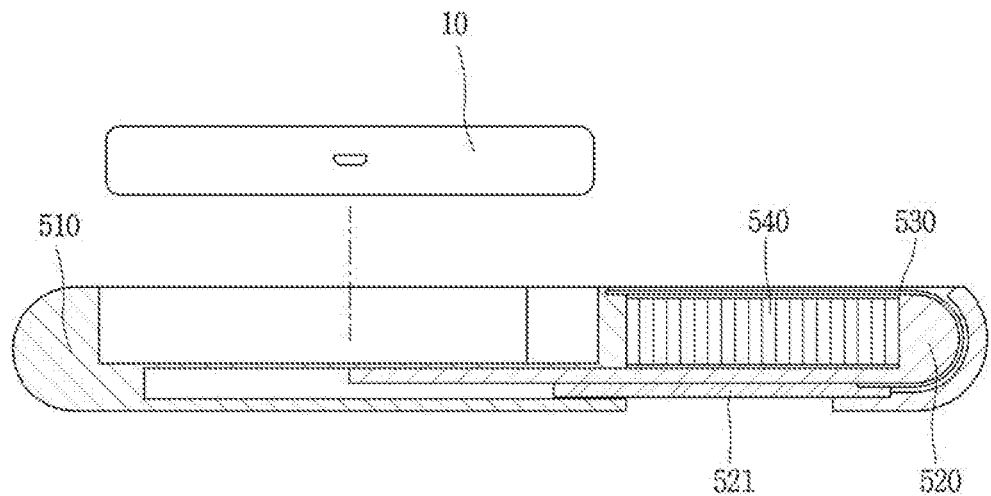

FIG. 11 is a conceptual view illustrating a structure for additionally installing a terminal.

BEST MODE OF CARRYING OUT EMBODIMENTS

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known technology or construction is considered to unnecessarily divert the main point of the present disclosure, such explanation has been omitted but would be understood by those skilled in the art. Also, it should be understood that the accompanying drawings are merely illustrated to easily explain the concept of the disclosure, and therefore, they should not be construed to limit the technological concept disclosed herein by the accompanying drawings, and the concept of the present disclosure should be construed as being extended to all modifications, equivalents, and substitutes included in the concept and technological scope of the disclosure.

Though the terms including an ordinal number such as first, second, etc. may be used herein to describe various elements, the elements should not be limited by those terms. The terms are used merely for the purpose to distinguish an element from another element.

It will be understood that when an element is referred to as being "connected with" another element, the element can be directly connected with the other element or intervening elements may also be present. On the contrary, in case where an element is "directly connected" or "directly linked" to another element, it should be understood that any other element is not existed therebetween.

A singular representation may include a plural representation unless it represents a definitely different meaning from the context.

Terms such as "include" or "has" are used herein and should be understood that they are intended to indicate the existence of a feature, a number, a step, a constituent element, a component or a combination thereof disclosed in the specification, and it may also be understood that the existence or additional possibility of one or more other features, numbers, steps, constituent elements, components or combinations thereof are not excluded in advance.

Electronic devices presented herein may be implemented using a variety of different types of terminals. Examples of such devices include cellular phones, smart phones, laptop computers, digital broadcast terminals, personal digital assistants (PDAs), portable multimedia players (PMPs), navigators, slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like. Hereinafter, for the sake of convenience, a mobile terminal will be described as one example of a flexible display device.

Figure 1:
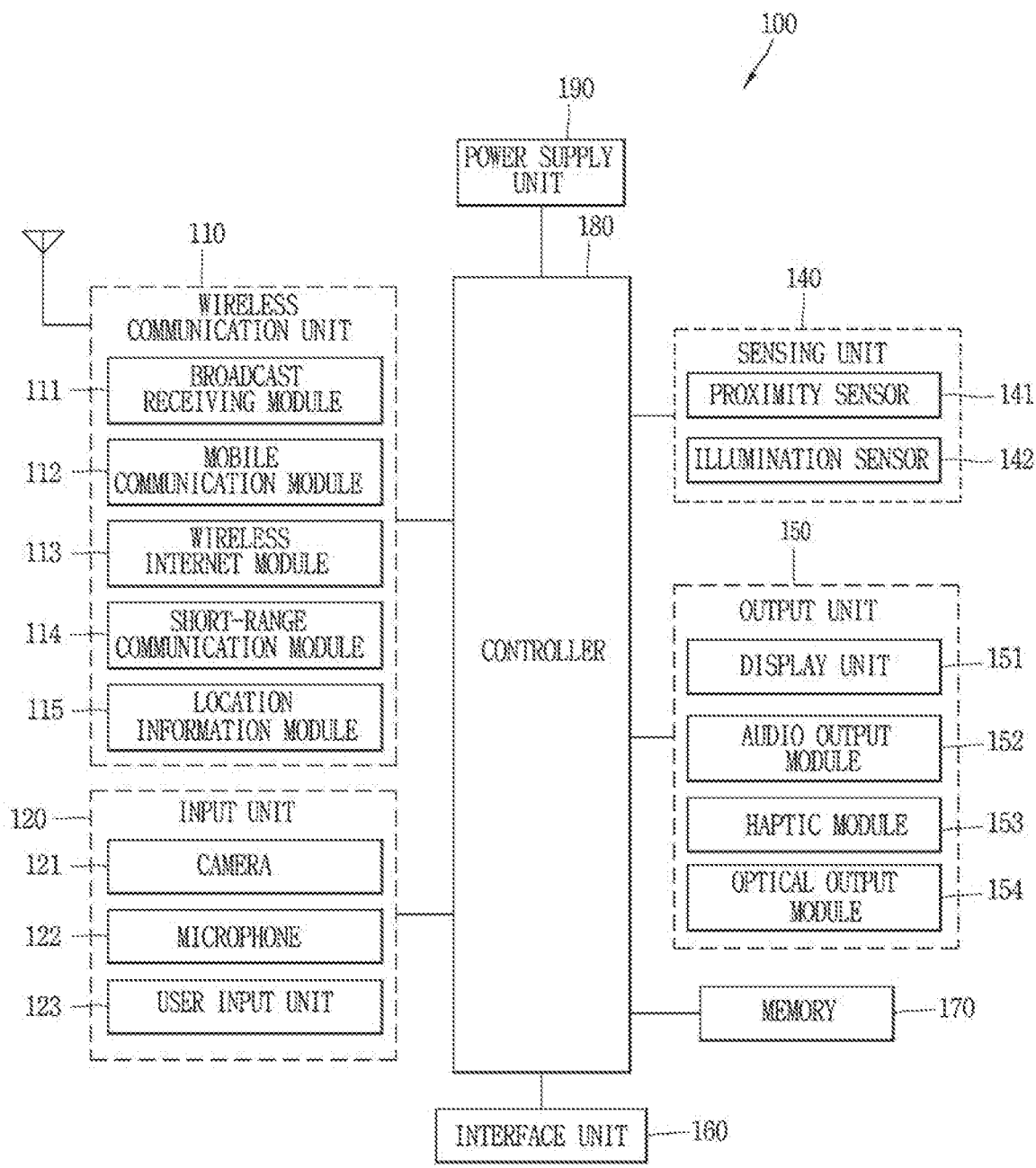
FIG. 1 is a block diagram of a mobile terminal according to an embodiment of the present disclosure.

FIG. 1 is a block diagram of a mobile terminal in accordance with the present disclosure.

The mobile terminal 100 may be shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement. Greater or fewer components may alternatively be implemented.

In more detail, the wireless communication unit 110 may typically include one or more modules which permit communications such as wireless communications between the mobile terminal 100 and a wireless communication system, communications between the mobile terminal 100 and another mobile terminal, or communications between the mobile terminal 100 and an external server. Further, the wireless communication unit 110 may typically include one or more modules which connect the mobile terminal 100 to one or more networks.

The wireless communication unit 110 may include one or more of a broadcast receiving module 111, a mobile communication module 112, a wireless Internet module 113, a short-range communication module 114, and a location information module 115.

The input unit 120 may include a camera 121 or an image input unit for obtaining images or video, a microphone 122, which is one type of audio input device for inputting an audio signal, and a user input unit 123 (e.g., a touch key, a mechanical key, and the like) for allowing a user to input information. Data (e.g., audio, image, and the like) may be obtained by the input unit 120 and may be analyzed and processed according to user commands.

The sensing unit 140 may typically be implemented using one or more sensors configured to sense internal information of the mobile terminal, the surrounding environment of the mobile terminal, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (e.g., camera 121), a microphone 122, a battery gauge, an environment sensor (e.g., a barometer, a hygrometer, a thermometer, a radiation detection sensor, a thermal sensor, and a gas sensor, among others), and a chemical sensor (e.g., an electronic nose, a health care sensor, a biometric sensor, and the like). The mobile terminal disclosed herein may be configured to utilize information obtained from at least two sensors of the sensing unit 140, and combinations thereof.

The output unit 150 may typically be configured to output various types of information, such as audio, video, tactile output, and the like. The output unit 150 may be shown having at least one of a display unit 151, an audio output module 152, a haptic module 153, and an optical output module 154. The display unit 151 may have an inter-layered structure or an integrated structure with a touch sensor in order to implement a touch screen. The touch screen may function as the user input unit 123 which provides an input interface between the mobile terminal 100 and the user and simultaneously provide an output interface between the mobile terminal 100 and a user.

The interface unit 160 may serve as an interface with various types of external devices that are coupled to the mobile terminal 100. The interface unit 160, for example, may include any of wired or wireless headset ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 may be implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). Application programs may be stored in the memory 170, installed in the mobile terminal 100, and executed by the controller 180 to perform an operation (or function) for the mobile terminal 100.

The controller 180 may typically function to control an overall operation of the mobile terminal 100, in addition to the operations associated with the application programs. The controller 180 may provide or process information or functions appropriate for a user by processing signals, data, information and the like, which are input or output by the aforementioned various components, or activating application programs stored in the memory 170.

Also, the controller 180 may control at least some of the components illustrated in FIG. 1, to execute an application program that have been stored in the memory 170. In addition, the controller 180 may control at least two of those components included in the mobile terminal 100 to activate the application program.

The power supply unit 190 may be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least part of the components may cooperatively operate to implement an operation, a control or a control method of a mobile terminal according to various embodiments disclosed herein. Also, the operation, the control or the control method of the mobile terminal may be implemented on the mobile terminal by an activation of at least one application program stored in the memory 170.

Hereinafter, description will be given in more detail of the aforementioned components with reference to FIG. 1, prior to describing various embodiments implemented through the mobile terminal 100.

First, regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneous reception of two or more broadcast channels, or to support switching among broadcast channels.

The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, a data broadcast signal, and the like. Also, the broadcast signal may further include a broadcast signal in a form that a TV or radio broadcast signal is combined with a data broadcast signal.

The broadcast signal may be encrypted by at least one of technical standards (or broadcasting methods, e.g., ISO, IEC, DVB, ATSC, etc.) for transmitting and receiving a digital broadcast signal. The broadcast receiving module 111 may receive the digital broadcast signal using a method suitable for a technical standard selected from those technical standards.

Examples of the broadcast associated information may include information associated with a broadcast channel, a broadcast program, a broadcast service provider, and the like. The broadcast associated information may be provided via a mobile communication network. In this case, the broadcast associated information may be received by the mobile communication module 112.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like. The broadcast signal and/or the broadcast related information received through the broadcast receiving module 111 may be stored in the memory 160.

The mobile communication module 112 may transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (e.g., Global System for Mobile Communication (GSM), Code Division Multi Access (CDMA), CDMA 2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

The wireless signal may include various types of data depending on a voice call signal, a video call signal, or a text/multimedia message transmission/reception.

The wireless Internet module 113 refers to a module for wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), LTE-advanced (LTE-A) and the like. The wireless Internet module 113 may transmit/receive data according to one or more of such wireless Internet technologies, and other Internet technologies as well.

When the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications may include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks may be a Wireless Personal Area Network (WPAN).

Here, another mobile terminal (which may be configured similarly to mobile terminal 100) may be a wearable device, for example, a smart watch, a smart glass, or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position (or current position) of the mobile terminal. As an example, the location information module 115 may include a Global Position System (GPS) module, or a Wi-Fi module. For example, when the mobile terminal uses a GPS module, a position of the mobile terminal may be acquired using a signal sent from a GPS satellite. As another example, when the mobile terminal uses the Wi-Fi module, a position of the mobile terminal may be acquired based on information related to a wireless access point (AP) which transmits or receives a wireless signal to or from the Wi-Fi module. If desired, the location information module 115 may alternatively or additionally function with any of the other modules of the wireless communication unit 110 to obtain data related to the position of the mobile terminal. The location information module 115 is a module used for acquiring the position (or the current position) and may not be limited to a module for directly calculating or acquiring the position of the mobile terminal.

The input unit 120 may be configured to receive image information (or signal), audio information (or signal), data, or user input. The mobile terminal 100 may be provided with one or more cameras 121 to obtain image input. Such cameras 121 may process image frames of still pictures or video obtained by image sensors in a video call or image capture mode. The processed image frames may be displayed on the display unit 151 or stored in memory 170. Meanwhile, the cameras 121 may be arranged in a matrix configuration to permit a plurality of images having various angles or focal points to be input to the mobile terminal 100. Also, the cameras 121 may be located in a stereoscopic arrangement to acquire left and right images for implementing a stereoscopic image.

The microphone 122 processes an external audio signal into electric audio (sound) data. The processed audio data may be processed in various manners according to a function being executed in the mobile terminal 100. If desired, the microphone 122 may include assorted noise removing algorithms to remove unwanted noise generated in the course of receiving the external audio signal.

The user input unit 123 is a component that permits input by a user. Such user input may enable the controller 180 to control operation of the mobile terminal 100. The user input unit 123 may include one or more of a mechanical input element (e.g., a mechanical key, a button located on a front and/or rear surface or a side surface of the mobile terminal 100, a dome switch, a jog wheel, a jog switch, and the like), or a touch-sensitive input element, among others. As one example, the touch-sensitive input element may be a virtual key, a soft key or a visual key, which is displayed on a touch screen through software processing, or a touch key which is located on the mobile terminal at a location that is other than the touch screen. Meanwhile, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like, and generate a corresponding sensing signal. The controller 180 may cooperate with the sensing unit 140 to control operations of the mobile terminal 100 or execute data processing, a function or an operation associated with an application program installed in the mobile terminal based on the sensing signal. The sensing unit 140 may be implemented using any of a variety of sensors, some of which will now be described in more detail.

The proximity sensor 141 refers to a sensor to sense presence or absence of an object approaching a surface, or an object located near a surface, by using an electromagnetic field, infrared rays, or the like without a mechanical contact. The proximity sensor 141 may be disposed at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared ray proximity sensor, and the like. When the touch screen is implemented as a capacitance type, the proximity sensor 141 may be configured to sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (e.g., distance, direction, speed, time, position, moving status, and the like). In general, controller 180 may process data corresponding to proximity touches and proximity touch patterns sensed by the proximity sensor 141, and cause output of visual information on the touch screen. In addition, the controller 180 may control the mobile terminal 100 to execute different operations or process different data (or information) according to whether a touch with respect to a point on the touch screen is either a proximity touch or a contact touch.

A touch sensor senses a touch (or a touch input) applied to the touch screen (or the display unit 151) using any of a variety of touch methods. Examples of such touch methods may include a resistive type, a capacitive type, an infrared type, and a magnetic field type, among others.

As one example, the touch sensor may be configured to convert changes of pressure applied to a specific part or portion of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

Meanwhile, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches include a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize location information related to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121, which has been depicted as a component of the input unit 120, may include at least one of a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors (TRs) at rows and columns to scan content received at the photo sensor using an electrical signal which changes according to the quantity of applied light. Namely, the photo sensor may calculate the coordinates of the physical object according to variation of light to thus obtain location information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

Also, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 may receive audio data from the wireless communication unit 110 or output audio data stored in the memory 170 during modes such as a signal reception mode, a call mode, a record mode, a voice recognition mode, a broadcast reception mode, and the like. The audio output module 152 may provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 may be configured to generate various tactile effects that a user feels, perceives, or otherwise experiences. A typical example of a tactile effect generated by the haptic module 153 is vibration. The strength, pattern and the like of the vibration generated by the haptic module 153 may be controlled by user selection or setting by the controller 180. For example, the haptic module 153 may output different vibrations in a combining manner or a sequential manner.

Besides vibration, the haptic module 153 may generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 may also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 may output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 may receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device may be connected with the terminal 100 via the interface unit 160.

When the mobile terminal 100 is connected with an external cradle, the interface unit 160 may serve as a passage to allow power from the cradle to be supplied to the mobile terminal 100 or may serve as a passage to allow various command signals input by the user from the cradle to be transferred to the mobile terminal therethrough. Various command signals or power input from the cradle may operate as signals for recognizing that the mobile terminal is properly mounted on the cradle.

The memory 170 may store programs to support operations of the controller 180 and store input/output data (e.g., phonebook, messages, still images, videos, etc.). The memory 170 may store data related to various patterns of vibrations and audio which are output in response to touch inputs on the touch screen.

The memory 170 may include one or more types of storage mediums including a flash memory type, a hard disk type, a solid state disk (SSD) type, a silicon disk drive (SDD) type, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control operations relating to application programs and the general operations of the mobile terminal 100. For example, the controller 180 may set or release a lock state for restricting a user from inputting a control command with respect to applications when a status of the mobile terminal meets a preset condition.

The controller 180 may also perform the controlling and processing associated with voice calls, data communications, video calls, and the like, or perform pattern recognition processing to recognize a handwriting input or a picture drawing input performed on the touch screen as characters or images, respectively. In addition, the controller 180 may control one or a combination of those components in order to implement various exemplary embodiments disclosed herein.

The power supply unit 190 receives external power or provides internal power and supply the appropriate power required for operating respective elements and components included in the wearable device 100 under the control of the controller 180. The power supply unit 190 may include a battery, which is typically rechargeable or be detachably coupled to the terminal body for (re)charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without using the connection port. In this example, the power supply unit 190 may receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, or similar medium using, for example, software, hardware, or any combination thereof.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

The display module 151 may include at least one of a liquid crystal display (LCD), a thin film transistor-LCD (TFT LCD), an organic light-emitting diode (OLED), a flexible display, a three-dimensional (3D) display, and an e-ink display.

The display unit 151 may be implemented using two display devices, according to the configuration type thereof. For instance, a plurality of display units 151 may be arranged on one side, either spaced apart from each other, or these devices may be integrated, or these devices may be arranged on different surfaces.

The display unit 151 may include a touch sensor that senses a touch with respect to the display unit 151 so as to receive a control command in a touch manner. Accordingly, when a touch is applied to the display unit 151, the touch sensor may sense the touch, and the controller 180 may generate a control command corresponding to the touch. Contents input in the touch manner may be characters, numbers, instructions in various modes, or a menu item that can be specified.

The microphone 122 may be configured to receive the user's voice, other sounds, and the like. The microphone 122 may be provided at a plurality of locations, and configured to receive stereo sounds.

The interface unit 160 may serve as a path allowing the mobile terminal 100 to interface with external devices. For example, the interface unit 160 may be at least one of a connection terminal for connecting to another device (e.g., an earphone, an external speaker, or the like), a port for near field communication (e.g., an Infrared DaAssociation (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

At least one antenna for wireless communication may be disposed on the terminal body. The antenna may be embedded in the terminal body or formed in the case. For example, an antenna which configures a part of the broadcast receiving module 111 (see FIG. 1) may be retractable into the terminal body. Alternatively, an antenna may be provided in the form of film to be attached onto an inner surface of a housing, or a case including a conductive material may serve as an antenna.

The terminal body is provided with a power supply unit 190 (see FIG. 1) for supplying power to the mobile terminal

100. The power supply unit 190 may include a battery 191 which is mounted in the terminal body or detachably coupled to an outside of the terminal body.

The battery 191 may receive power via a power cable connected to the interface unit 160. Also, the battery 191 may be (re)chargeable in a wireless manner using a wireless charger. The wireless charging may be implemented by magnetic induction or electromagnetic resonance.

An accessory for protecting an appearance or assisting or extending the functions of the mobile terminal 100 may further be provided on the mobile terminal 100. As one example of the accessory, a cover or pouch for covering or accommodating at least one surface of the mobile terminal 100 may be provided. The cover or pouch may cooperate with the display unit 151 to extend the function of the mobile terminal 100. Another example of the accessory may be a touch pen for assisting or extending a touch input onto a touch screen.

(a) of FIG. 2 is a sectional view of a flexible display device in a first state, and (b) of FIG. 2 is a sectional view of the flexible display device in a second state.

A flexible display device refers to a device having a flexible display designed to be deformable so as to allow a screen size to be changed, which can be understood as one type of the mobile terminals described earlier. In this specification, a mobile terminal will be referred to as a "flexible display device".

In a flexible display device 200, a flexible display 230 may be exposed to an outside of a first body 210 and a second body 220. A screen size of a front surface of the flexible display device 200 may be variable or changeable according to movement between the first body 210 and the second body 220, thereby providing the screen in various ways.

As shown in (a) of FIG. 2, a first state of the flexible display device 200 may be achieved when the first body 210 and the second body 220 are closely located to each other. In the first state, an area exposed through the front surface of the flexible display 230 may be decreased.

That is, the area of the flexible display 230 exposed to the outside is in a reduced state while the flexible display device 200 is in the first state.

Also, as shown in (b) of FIG. 2, the flexible display device 200
may be in a second state in which the first body 210 and the second body 220 are located far from each other by relative movement with respect to each other. In this case, the area of the flexible display 230 exposed through the front surface of the flexible display device 200 may be increased.

That is, the area of the flexible display 230 exposed to the outside is in an increased state while the flexible display device 200 is in the second state.

Here, as the first body 210 and the second body move with respect to each other, the flexible display device 200 may be freely converted to the second state from the first state, and vice versa. Therefore, this will not only be limited to the first state or the second state.

For example, when a direction in which the second body 220 moves relative to the first body 210 to be away from each other is referred to as a first direction, the area exposed to the front surface of the flexible display device 200 may be increased along the first direction as the second body 220 moves relative to the first body 210 in the first direction.

Likewise, when the second body 220 moves relative to the first body 210 in a second direction opposite to the first direction so as to be close to each other, the area exposed to the front surface of the flexible display device 200 may be decreased along the second direction.

The flexible display device 200 according to the present disclosure may be provided with the flexible display 230 configured to be deformable when an external force is applied.

Here, deformation may be at least one of curving, bending, folding, twisting, and rolling of a display module. Such a deformable display module may be referred to as a 'flexible display'. Here, the flexible display 230 may include a typical flexible display, electronic paper (e-paper), and a combination thereof.

The typical flexible display refers to a durable display that is lightweight and does not break easily by being fabricated on a thin, flexible substrate, such as paper, which is bent, curved, folded, twisted or rolled while maintaining characteristics of an existing flat panel display.

In addition, the electronic paper is a display to which general ink properties are applied, and is different from the existing flat panel display in view of using reflected light. The electronic paper may change information by using a twist ball or electrophoresis using a capsule.

In the flexible display device 200 according to the present disclosure, one side of the flexible display 230 may be configured to be deformable (e.g. having a finite radius of curvature) by an external force, and a position of the deformed one side of the flexible display 230 may vary according to movement between the first body 210 and the second body 220.

The flexible display 230 may output visual information in the first state and the second state through the exposed screen. Such visual information may be achieved by independently controlling an emission of unit pixels (sub-pixels) arranged in a matrix form. The unit pixel denotes an elementary unit for representing one color.

One side of the flexible display 230 may have a curved shape or state (e.g., a shape having a constant curvature along an outer surface of a roller (or rotating member)) in the first state and the second state, respectively, rather than a flat shape.

When an external force is applied to the flexible display 230, the flexible display 230 may be deformed into a flat shape (or a less curved shape), or a more curved shape.

Meanwhile, the flexible display 230 may be combined with a touch sensor to implement a flexible touch screen. When a touch is applied to the flexible touch screen the controller 180 (see FIG. 1) may perform a control corresponding to the touch input. The flexible touch screen may be configured to sense a touch input in the second state as well as in the first state.

In a modified example, the flexible display device 200 may include a deformation detection element (or sensor) configured to detect deformation of the flexible display 230. The deformation detection element may be included in the sensing unit 140 (see FIG. 1).

The deformation detection element may be provided at one side of the flexible display 230 or one side of the first body 210 or second body 220, so as to detect information regarding deformation of the flexible display 230. Here, the deformation related information may be about a deformed direction, deformed degree, deformed position, and deformed time of the flexible display 230, and an acceleration at which the deformed flexible display 230 is restored. Besides, the deformation related information may be various, for example, information that can be detectable when the flexible display 230 is being curved.

Here, the controller 180 (see FIG. 1) may change information displayed on the flexible display 230, or generate a control signal for controlling functions of the flexible display device 200 based on information regarding deformation of the flexible display 230 detected by the deformation detection element.

Besides the external force, the flexible display 230 may be deformed by other methods. For example, when the flexible display 230 is in the first state, the flexible display 230 may be deformed to the second state by a command of a user or an application. Likewise, the flexible display 230 may be deformed to the first state from the second state by the same manner.

The flexible display 230 may include a first region 231 and a second region 232. The first region 231 may be fixedly coupled to a front surface of the first body 210, and one end of the second region 232 may be fixed to a sliding member 221 sliding on a rear surface of the second body 220.

Here, the first region 231 may be basically in a flat state as an area exposed to the outside does not change, and the second region 232 may be curved as its shape is deformed inside the second body 220.

In addition, the flexible display device 200 may have a case (e.g., a frame, a cover, etc.) defining an outer appearance. The case may include the first body 210 and the second body 220. Various electronic components may be disposed in the first body 210 and the second body 220.

The flexible display device 200 may further include a rear plate 231*a* coupled to a rear surface of the flexible display 230, so as to allow the flexible display 230 to be smoothly rolled and unrolled.

The rear plate 231*a* that serves to support the rear surface of the flexible display 230 may be made of a thin superelastic titanium alloy, so as to reduce or minimize stress applied to the flexible display 230 when the flexible display 230 is deformed while being rolled or unrolled.

Here, the rear plate 231*a* may be made of a superelastic titanium alloy having a yield strain of approximately 2.0 to 2.5% (on the basis of 0.3 mm thickness). The rear plate 231 may be made of a titanium-nickel (Ti—Ni) based alloy, a titanium-aluminum (Ti—Al) alloy, and thin stainless steel (STS) in addition to the superelastic titanium alloy.

The rear plate 231*a*, together with the flexible display 230, may be deformed by rotation between link members 241, 242, and 243 connected to one another.

A front surface of the rear plate 231*a* may be tightly coupled to the rear surface of the flexible display 230, and one side of a rear surface of the rear plate 231*a* may be rolled along an outer circumferential surface of a rotating member installed inside the second body 220.

The flexible display device 200 may include the rotating member installed inside the second body 220 in a rotatable manner. The rotating member may have a cylindrical shape so as to be rotatable inside the second body 220, allowing the flexible display 230 to be rolled on an outer surface.

The flexible display 230 and the rear plate 231*a* may be coupled to each other by an adhesive member.

The adhesive member may serve to couple the rear surface of the flexible display 230 and the rear plate 231*a*. As the rear plate 231*a* and the flexible display 230 are deformed, a space may be generated between the rear plate 231*a* and the flexible display 230. Accordingly, the adhesive member may be made of a material having flexible properties (e.g., elastically flexible material) to prevent lifting of the flexible display 230.

Further, the adhesive member may prevent stress from occurring between the rear plate 231*a* and the flexible display 230, thereby suppressing breakage of the flexible display 230 caused by an external force.

The adhesive member may be made of resin (e.g., elastomer resin) having an elastic force, for example, synthetic epoxy resin, and the like. Accordingly, the adhesive member may allow the flexible display 230 and the rear plate 231*a* to be tightly coupled to each other. In addition, even when one side of the flexible display 230 is deformed, the adhesive member may correspond to this, thereby allowing the rear plate 231*a* to be smoothly deformed together with the flexible display 230.

FIG. 3 is a conceptual view illustrating the flexible display device 200 in (b) of FIG. 2.

The flexible display device 200 may include the first body 210, the second body 220, the flexible display 230, and a link part 240.

The first body 210 and the second body 220 may define an outer appearance of the flexible display 230. As the second body 220 slides along the first body 210, the second body 220 may move relative to the first body 210, allowing the first state and the second state to be achieved.

The sliding member 221 allows the first body 210 and the second body 220 to move with respect to each other.

Here, the flexible display 230 may be coupled to one surface of the first body 210 and the second body 220, respectively, which are connected to be relatively movable with each other. The flexible display 230 may be configured to be deformed according to movement of the first body 210 and the second body 220.

When a user grips and pulls one side of the second body 220 to extend (or expand) the area of the flexible display 230 exposed to the front surface of the flexible display 230, the sliding member 221 of the second body 220 moves as much to the increased area of the flexible display 230 along a sliding guide 211 of the first body 210, so as to cover an extended length of the flexible display 230.

That is, in the flexible display device 200 according to the present disclosure, a distance between the first body 210 and the second body 220 is changed by the sliding member 221 of the second body 220 that moves along the first body 210.

The first body 210 and the second body 220 defining an outer appearance of the flexible display device 200 may be converted to the second state from the first state, or vice versa according to relative movement between the first body 210 and the second body 220.

The second body 220 may be close to or away from the first body 210 by sliding with respect to the first body 210, so as to achieve the first state in which the second body 220 is in close contact with the first body 210, or the second state in which the first body 210 and the second body 220 are far away from each other.

A side surface portion may be formed around the first body 210, and the side surface portion may define the outer appearance of the flexible display device 200 except an end in the first direction, namely, the end through which the second body 220 is inserted or pulled. In addition, the side surface portion of the first body 210 may be provided with an interface module for connecting a power port or an ear jack, or a user input portion such as a volume button. The side surface portion may serve as an antenna in case it contains a metal material.

The second body 220 may be coupled to the side surface portion of the first body 210. When the first body 210 is converted to the second state from the first state, the second body 220 may support the rear surface of the extended flexible display 230.

Further, a side surface portion of the second body 220 may be made of an opaque material, or a transparent material. Here, a transparent window may be provided on the side surface portion of the second body 220, so that an image or a text (or letter) output from the flexible display 230 may be exposed to the outside.

The flexible display 230 may include the first region 231 fixedly attached to the first body 210 and exposed to the outside all the time, and the second region 232 exposed to the outside depending on the state of the flexible display device 200 having one end thereof fixed to the sliding member 221.

The sliding member 221 is a disk-shaped member slidable along the rear surface of the second body 220. When the second body 220 is close to or away from the first body 210, the sliding member 221 may move relative to the second body 220 corresponding to a movement distance of the second body 220 while supporting one side of the second region 232 of the flexible display 230.

When converted to the second state from the first state, the second body 220 moves with respect to the first body 210 by a first distance d. Then, the flexible display 230 should move by a second distance 2d, which is twice the first distance d. Here, in order for an end of the flexible display 230 to move by the second distance 2d, the sliding member 221 sliding along with the second body 220 should also move the same distance as the second body 220, namely, the first distance d.

The flexible display device 200 may include the link part 240. Referring to FIG. 3, as the first body 210 and the second body 220 move relative to each other, the link part 240 is deformed, thereby achieving the first state and the second state of the flexible display device 200.

Here, the link part 240 may entirely support the second region 232 of the flexible display 230, which is extended by deformation. This may prevent an external force from being applied to one specific portion of the extended flexible display 230. As a result, accumulation of fatigue on the corresponding portion may be reduced, thereby preventing the flexible display 230 from being damaged.

A plurality of link parts 240 may be disposed at a space formed between the first body 210 and the second body 220. For a stable movement between the first body 210 and the second body 220, the link parts 240 may be installed parallel to each other. In FIG. 3, two link parts 240 are arranged in a parallel manner. However, this is just one example, and the number of the link parts 240 may vary and be installed in various manners by taking a distance, width, and length between the first body 210 and the second body 220 into consideration.

(a) of FIG. 4 is a perspective view of the link part 240. In (b) and (c) of FIG. 4, link members constituting the link part 240 are illustrated. (a) of FIG. 5 is a conceptual view illustrating the link part 240 when the flexible display device 200 is in the first state, and (b) of FIG. 5 is a conceptual view illustrating the link part 240 when the flexible display device 200 is in the second state.

The link part 240 may include a plurality of link members 241, 242, and 243 connected to one another. Rotation between the link members 241, 242, and 243 may allow the second body 220 to move relative to the first body 210 while sliding with respect to the first body 210.

The link part 240 may have the same height as the first body 210 and the second body 220. In detail, when the flexible display device 200 are in the first state or the second state, the link part 240 may support and cover a space formed between the first body 210 and the second body 220.

As the link part 240 entirely supports the second region 232 of the flexible display 230, which is extended by deformation, an external force is not continuously applied to one specific portion of the extended flexible display 230. This may allow accumulation of fatigue on the corresponding portion to be reduced, thereby preventing the flexible display 230 from being damaged.

The link members 241, 242, and 243 are installed between the first body 210 and the second body 220, and may be configured such that adjacent members are movable with respect to each other so as to correspond to relative movement between the first body 210 and the second body 220. Here, the plurality of link members 241, 242, and 243 may form a constant rotation angle between the adjacent members.

In detail, when the first body 210 and the second body 220 are far away from each other, the link members 241, 242, and 243 may be deformed in a spread-out (or unfolded) shape. When the first body 210 and the second body 220 are close to each other, the link members 241, 242, and 243 may be deformed to be in close contact with each other.

For example, as shown in FIG. 4, when the flexible display device 200 is in the second state, the link part 240 may be configured such that the plurality of link members 241, 242, and 243 is arranged in a hexagonal shape. One side of the link part 240 may be fixed to the first body 210, and another side thereof may be fixed to the second body 220. Accordingly, when the first body 210 and the second body 220 are away from each other, the plurality of link members 241, 242, 243 are spread out to be arranged in the hexagonal shape. This allows stable movement of the first body 210 and the second body 220 to be achieved. Here, when the plurality of link members 241, 242, 243, made up of 6 members in total, is arranged in the hexagonal shape, an angle between each of the link members 241, 242, 243 may be approximately 120 degrees. However, the link part 240 may comprise any number of link members.

However, the plurality of link members 241, 242, and 243 may be arranged in other various polygonal shapes.

The link members 241, 242, and 243 may be defined as a first member 241, a second member 242, and a third member 243, respectively.

The first member 241 may extend in one direction, and one side thereof may be fixedly coupled to the first body 210.

The first member 241 may include a first extended portion 241a, a first connecting portion 241b, and a fixing portion 241c.

The first extended portion 241a defining an overall appearance of the first member 241 may extend in one direction.

The fixing portion 241c may protrude from one surface of the extended portion 241a. For example, the fixing portion 241c may have a protruding surface with a 'T' shape, so as to be coupled to one side of the first body 210. Accordingly, the first member 241 may not be separated from the first body 210. The fixing portion 241c may be coupled to the first body 210 in various manners such as fitting, insertion, fixing, and the like.

The first connecting portion 241b may be formed in a ring shape at both ends (e.g., first and second ends) of the first extended portion 241a. The first connecting portion 241b may have a hole extending in a vertical (up-and down) direction so as to form a hinge axis.

The first connecting portion 241b may be fitted to a second connecting portion 242b, and thus a height of the first extended portion 241a may be greater than a height of the first connecting portion 241b.

As the second member 242 is connected to the first member 241, and moves relative to the first connecting portion 241b, the second member 242 may rotate with the first member 241 with respect to the hinge axis.

The second member 242 may include a second extended portion 242a and the second connecting portion 242b.

The second extended portion 242a defining an outer appearance of the second member 242 may extend in one direction.

The second connecting portion 242b may protrude from both ends of the second extended portion 242a. As described above, the first connecting portion 241b may be fitted to the second connecting portion 242b so as to form the hinge axis for rotation together with the first connecting portion 241b. The second connecting portion 242b may protrude from both upper and lower ends of the second extended portion 242a, respectively, so as to cover and support both upper and lower ends of the first connecting portion 241b. Further, the second connecting portion 242b of a second member 242 may be connected to a second connecting portion 242b of a different second member 242.

The third member 243 may be connected to at least one second member 242, and may be connected to two second members 242, and one side thereof may be coupled to the second body 220.

Since the third member 243 may have a similar shape and the same or similar structure as the first member 241, description thereof will be omitted.

Meanwhile, the first member 241, the second member 242, and the third member 243 may be made with any type of material, including plastic, metal and ceramic, but are typically made with a plastic injection molded material.

Due to movement between the first member 241, the second member 242, and the third member 243 constituting the link part 240, a constant angle may be formed therebetween. Accordingly, the first state of the flexible display device 200 may be achieved as shown in (a) of FIG. 5, and the second state of the flexible display device 200 may be realized as shown in (b) of FIG. 5.

(a) and (b) of FIG. 6 are conceptual views of another embodiment of a link part, illustrating a flexible display in a first state and a second state, respectively.

A link part 340 may include a plurality of link members 341, 342, and 343, and each of the plurality of link members 341, 342, and 343 may be arranged in parallel with each other.

That is, the link members 341, 342, and 343 constituting the link part 340 located between a first body 310 and a second body 320 may be arranged in series and/or parallel. The link members 341, 342, and 343 may be configured to be rotatable in respond to relative movement between the first body 310 and the second body 320.

In detail, as shown in (a) of FIG. 6, the first body 310 and the second body 320 may move with respect to one another to be in close contact with each other. Here, when each of the link parts 340 is deformed to be in close contact with each other, the first body 310 and the second body 320 may come in close contact with each other, thereby reducing an area of a flexible display 330 exposed to the outside.

In addition, as shown in (b) of FIG. 6, when the first body 310 and the second body 320 move with respect to one another to be far away from each other, the link part 340 is spread out (or unfolded) to be extended. Then, the first body 310 and the second body 320 are far away from each other, thereby increasing the area of the flexible display 330 exposed to the outside.

FIG. 7 is an enlarged conceptual view of a rotation restriction (or prevention) portion 342a' provided at the second member 342.

The rotation restriction portion 342a' may protrude from one side of a second extended portion 342a of the second member 342. The rotation restriction portion 342a' may protrude outward from one side of the second extended portion 342a of the second member 342. The rotation restriction portion 342a' may be formed at one side of any one of the second members 342 disposed adjacent to each other.

The rotation restriction portion 342a' may have a shape of a protruding or extended jaw that may limit (or restrict) an angle of rotation when the second members 342 rotate with respect to each other.

Rotation between the second members 342 is allowed when the state is converted such that a distance between the first body 310 and the second body 320 is far away. Here, when the angle of rotation between the second members 342 exceeds a specific angle range, the adjacent second members 342 meet or touch each other by the rotation restriction portion 342a', and thus rotation is no longer available.

In other words, the rotation restriction portion 342a' may not only limit a relative movement distance between the first body 310 and the second body 320, but also enable stable movement of the flexible display device 300 by limiting the angle of rotation between the second members 342.

FIG. 8 is a conceptual view of another embodiment of a link part 440 provided with an elastic member 450 for supporting a flexible display together with the link part 440, and FIG. 9 is an enlarged conceptual view illustrating the link part 440 provided with the elastic member 450.

A flexible display device 400 may further include the elastic member 450 for providing an elastic force to the link part 440.

The elastic member 450 may be installed such that both ends thereof are respectively fixed to one side of a first body 410 and one side of a second body 420.

The elastic member 450 may be a compression spring. The elastic member 450 may provide an elastic force in a direction that limits rotation between a first member 441, a second member 442, and a third member 443 even when the first body 410 and the second body 420 move with respect to each other.

In detail, a hole greater than a diameter of the elastic member 450 may be formed in a central portion of the first member 441 and the third member 443, respectively, so that the elastic member 450 penetrates through the link part 440. Thus, the elastic member 450 may provide an elastic force in response to deformation of the link part 440 according to relative movement between the first body 410 and the second body 420, allowing more stable movement of the flexible display device 400.

In addition, a plurality of elastic members 450 may be provided in parallel so that both ends thereof are supported between the first body 410 and the second body 420, thereby increasing the magnitude of elastic force.

(a) and (b) of FIG. 10 are conceptual views of a flexible display device according to another embodiment of the present disclosure, and FIG. 11 is a conceptual view illustrating a structure for additionally installing a terminal.

As described above, in the flexible display device 500, an area of a flexible display 530 exposed to a front surface of a terminal may be changed through relative movement between a first body 510 and a second body 520, thereby achieving a screen having various sizes. Thus, consumers or users can use it in various ways, such as a mobile phone, a tablet, and the like.

A link part 540 may be provided to support an extended area of the flexible display device 500, which is extended by deformation in response to movement of the first body 510 and the second body 520, as described in the previous embodiment.

However, a terminal mounting space S recessed by a thickness of an additional (or another) mobile terminal 10 may be provided at a front surface of the first body 510, so as to allow the additional mobile terminal 10 to be mounted. As the additional mobile terminal 10 is mounted to the terminal mounting space S, a screen of various sizes may be implemented through the first state and second state of the flexible display device 200 described with reference to FIGS. 1 to 9. This may result in improving user convenience.

The aforementioned flexible display device is not limited to the configurations and the methods of the embodiments described above, but all or some of the embodiments may be selectively combined so that various modifications can be made.

INDUSTRIAL APPLICABILITY

The present disclosure may be variously implemented or applicable in or to an industrial field using a flexible display device.

What is claimed is:

1. A flexible display device, comprising:
a flexible display;
a first body;
a second body located side by side with the first body, the second body being configured to move relative to the first body to change an area of the flexible display exposed to outside of the flexible display device; and
a link part fixed to a first side of the first body and fixed to a first side of the second body and located between the first body and the second body, the link part being configured to be deformable to guide the second body to move toward and away from the first body,
wherein a terminal mounting space to which a mobile terminal is configured to be mounted is recessed from a front surface of the first body.

2. The flexible display device of claim 1, the link part includes a plurality of link members arranged in a hexagonal shape.

3. The flexible display device of claim 2, wherein adjacent link members among the plurality of link members are rotatable with respect to each other to correspond to the relative movement between the second body and the first body.

4. The flexible display device of claim 1, wherein the link part includes a plurality of link members,
wherein adjacent link members among the plurality of link members are connected to one another, and
wherein a portion of the plurality of link members are configured to rotate when the second body moves with respect to the first body.

5. The flexible display device of claim 4, wherein the plurality of link members comprises:
a first member extending in a first direction and having a first side coupled to the first body;
a second member including:
a first connection portion connected to the first member; and
a second connection portion; and
a third member connected to the second member by the second connection portion and having a first side coupled to the second body.

6. The flexible display device of claim 5, wherein the second member is configured to be rotatable about the first member and to be rotatable about the third member.

7. The flexible display device of claim 5, wherein the first member comprises:
a first extended portion having a first surface and a second surface opposite the first surface, the first extended portion having a first end and a second end;
a fixing portion protruding from the second surface of the first extended portion; and
a first connecting portion provided at both the first end and the second end of the first extended portion, the first connection portion having a ring shape to define a hinge axis.

8. The flexible display device of claim 7, wherein the second member comprises:
a second extended portion having a first end and a second end; and
a second connecting portion protruding from both the first end and the second end of the second extended portion, and
wherein the second connection portion is attached to the first connecting portion to form the hinge axis.

9. The flexible display device of claim 8, wherein the second member is among a plurality of second members,
wherein at least one of the plurality of second members further comprises a rotation restriction portion that protrudes from one side of the second extended portion, and
wherein the rotation restriction portion has a protruding jaw shape to limit an angle of rotation between adjacent second members among the plurality of second members.

10. The flexible display device of claim 1, wherein a top surface of the link part is coplanar with a top surface of at least one of the first body or the second body.

11. The flexible display device of claim 1, wherein the area of the flexible display exposed to the outside is configured to decrease and the link part is configured to deform to a narrower shape, as the second body is moved closer to the first body.

12. The flexible display device of claim 11, wherein the area of the flexible display exposed to the outside is configured to increase and the link part is configured to deform to an expanded shape, as the second body is moved further away from the first body.

13. The flexible display device of claim 1, wherein a portion of the flexible display is rotatable inside the second body of the flexible display device, and
wherein the portion of the flexible display is configured to be rolled or unrolled inside the second body by the relative movement between the second body and the first body, to change the area exposed to the outside.

14. The flexible display device of claim 1, further comprising a rear plate coupled to a rear surface of the flexible display, the rear plate being configured to be deformable together with the flexible display.

15. A flexible display device of claim 1, comprising
a flexible display;
a first body;
a second body located side by side with the first body, the second body being configured to move relative to the first body to change an area of the flexible display exposed to outside of the flexible display device;

a link part fixed to a first side of the first body and fixed to a first side of the second body and located between the first body and the second body, the link part being configured to be deformable to guide the second body to move toward and away from the first body; and an elastic member extending through the link part to provide an elastic force in response to deformation of the link part, the elastic member having a first end fixed to the first body and a second end fixed to the second body.

16. A flexible display device, comprising:

a flexible display having a first portion exposed to outside of the flexible display device and a second portion configured to be rolled up in an interior space of the flexible display device;

a first body that is fixed;

a second body configured to:
  move away from the first body to unroll the flexible display and increase an amount of the flexible display exposed to the outside, and
  move towards the first body to roll up the flexible display and reduce the amount of the flexible display exposed to the outside; and a link part fixed to a first side of the first body and a first side of the second body, the link part being configured to be deformable between the first body and the second body to guide the second body as it moves relative to the first body, wherein the link part comprises a first member extending in a first direction and having a first side coupled to the first body and a second member, and wherein the first member comprises:

a first extended portion having a first surface and a second surface opposite the first surface, the first extended portion having a first end and a second end;

a fixing portion protruding from the second surface of the first extended portion; and a first connecting portion provided at both the first end and the second end of the first extended portion, the first connection portion having a ring shape to define a hinge axis.

17. The flexible display device of claim 16, wherein the link part comprises a plurality of link members, and wherein the plurality of link members comprises: the first member extending in the first direction and having the first side coupled to the first body; the second member including: a first connection portion connected to the first member; and a second connection portion; and a third member connected to the second member by the second connection portion and having a first side coupled to the second body.

18. The flexible display device of claim 16, wherein the second member comprises:

a second extended portion and having a first end and a second end; and a second connecting portion protruding from both the first end and the second end of the second extended portion, and wherein the second connection portion is attached to the first connecting portion to form the hinge axis.

* * * * *